United States Patent Office
3,382,269
Patented May 7, 1968

3,382,269
ACTIVATION OF ALUMINUM IN PREPARATION OF ALUMINUM ALKYLS
Billy J. Williams, Ponca City, Okla., and Paul A. Lobo, London, England, assignors to Continental Oil Company, Ponca City, Okla., a corporation of Delaware
No Drawing. Filed Dec. 30, 1964, Ser. No. 422,391
12 Claims. (Cl. 260—448)

ABSTRACT OF THE DISCLOSURE

It is disclosed that aluminum to be utilized in preparation of aluminum alkyls can be activated by the presence of a halide of titanium, zirconium, niobium, vanadium, scandium, uranium or hafnium.

This invention relates to activation of aluminum. In one aspect this invention relates to a process for increasing the reactivity of aluminum for preparation of alkylaluminum hydride or trialkylaluminum.

It is known to prepare organoaluminum compounds (e.g. triethylaluminum) by the direct reaction of aluminum metal with hydrogen and an olefin. Such a reaction can be represented by $$Al + 3C_nH_{2n} + 3/2H_2 \rightarrow Al(C_nH_{2n+1})_3$$

wherein $n$ is a whole number greater than unity. U.S. Patent 3,100,786, Aug. 13, 1963, Fernald and U.S. Patent 2,787,626, Apr. 2, 1957, Redman, describe two such processes.

However, such trialkylaluminum compounds are more conveniently prepared from aluminum, hydrogen and trialkylaluminum and an olefin by first preparing dialkylaluminum hydride as follows:

$$Al + 3/2H_2 + 2Al(C_nH_{2n+1})_3 \rightarrow 3Al(C_nH_{2n+1})_2H$$

followed by reacting with the olefin as follows:

$$Al(C_nH_{2n+1})_2H + C_nH_{2n} \rightarrow Al(C_nH_{2n+1})_3$$

The overall effect of the two reactions, then, is to produce three moles of trialkylaluminum for each two moles originally present.

For convenience, the preparation of triethylaluminum or diethylaluminum hydride will be discussed.

Although it is known that oxide-free aluminum reacts with trialkylaluminum and hydrogen under the influence of temperature and pressure to yield dialkylaluminum hydride, there is a considerable difference in the reactivity of various samples of aluminum even after identical mechanical treatment such as ball milling. For example, various aluminum powders have been found to have considerably different rates of reaction even though they have the same particle size distribution and have been activated in the same manner. This reactivity difference is in both the rate of reaction and the induction period before reaction begins.

It has previously been shown that the reactivity of aluminum can be greatly increased by alloying with small amounts of titanium or other catalytic elements (Radd et al. Patent 3,104,252). It is stated that such alloys are more effective than the use of aluminum and the catalytic element separately.

While the above system of Radd et al. does give excellent results, it does involve the step of preparing alloys. It has now been found that certain halides of these catalytic elements can activate the aluminum by simple admixture of such halides with the aluminum.

It is an object of this invention to provide a process for preparing organoaluminum compounds wherein improved reaction rates are obtained in the process by using reaction-promoting amounts of one or more catalytic metal halides.

It is another object of this invention to provide a means for overcoming the harmful effects of certain elements when present in aluminum, when said aluminum is used in the preparation of organoaluminum compounds, said means comprising the use of certain metal halides in catalytic amounts in addition to the aluminum containing the harmful elements.

Broadly stated, then, the present invention resides in the discovery that the use of reaction-promoting amounts of one or more metal halides in conjunction with aluminum gives improved reaction rates in processes wherein aluminum is used in the production of organoaluminum compounds.

Before proceeding to specific examples which illustrate the invention, it may be well to describe in general the materials of our invention and the terms used herein.

The term "organoaluminum compounds" as used herein refers to compounds having the general formula:

wherein $R_1$ is a hydrocarbon radical, and $R_2$ and $R_3$ are selected from the group consisting of hydrogen, halogen and hydrocarbon radicals. The hydrocarbon radical can contain 2 to 40 carbon atoms and can be alkyl, aryl, alkaryl or aralkyl. Illustrative of the organoaluminum compounds which can be prepared by the method of this invention are compounds such as the following:

Diethylaluminum chloride
Diethylaluminum bromide
Diisobutylaluminum chloride
Diisobutylaluminum iodide
Dioctylaluminum chloride
Dioctylaluminum fluoride
Dipentadecylaluminum bromide
Didocosylaluminum chloride
Diphenylaluminum hydride
Diphenylaluminum chloride
Di-para-tertiarybutylphenylaluminum hydride
Di-para-tertiarybutylphenylaluminum chloride
Diphenyloctylaluminum hydride
Diphenyloctylaluminum bromide
Triphenylaluminum
Tri-para-tertiarybutylphenylaluminum
Triphenyloctylaluminum This invention is particularly suitable for preparing organoaluminum compounds, such as the following:

Diethylaluminum hydride
Diisobutylaluminum hydride
Dioctylaluminum hydride
Dipentadecylaluminum hydride
Didocosylaluminum hydride
Ditetracontylaluminum hydride
Triethylaluminum
Triisobutylaluminum
Tiroctylaluminum
Tripentadecylaluminum
Tridocosylaluminum The halides which we have found to improve the efficacy of aluminum, in processes wherein aluminum is used to produce organoaluminum compounds are halides of the following metals: titanium, zirconium, niobium, vanadium, hafnium, scandium and uranium.

Representative of such halides are:

| | |
|---|---|
| Titanium dichloride | Uranium tetrachloride |
| Titanium trichloride | Uranium pentachloride |
| Titanium tetrachloride | Uranium tetrafluoride |
| Titanium dibromide | Uranium hexafluoride |
| Titanium tetrabromide | Uranium tetraiodide |
| Titanium trifluoride | Uranium tetrabromide |
| Titanium tetrafluoride | Uranium tribromide |
| Titanium diiodide | Vanadium tribromide |
| Titanium tetraiodide | Vanadium dichloride |
| Hafnium tetrachloride | Vanadium tribromide |
| Niobium pentachloride | Vanadium tetrachloride |
| Niobium pentabromide | Vanadium pentafluoride |
| Niobium pentafluoride | Zirconium tetrabromide |
| Scandium tribromide | Zirconium tetrachloride |
| Scandium trichloride | Zirconium tetrafluoride |
| Uranium trichloride | Zirconium tetraiodide. |

Any one or more of such halides above can be used to activate aluminum in the process according to this invention.

As has been indicated, the trialkylaluminum and aluminumalkyl hydride is prepared by the equation given above. Similarly aluminumalkyl halide can be prepared according to the following equation:

$$3C_nH_{2n} + Al + AlX_3 + 1\tfrac{1}{2}H_2 = (C_nH_{2n+1})AlX_2 + (C_nH_{2n+1})_2AlX$$

wherein $n$ is a positive whole number greater than unity and X represents a halide.

The aluminum in preparing the trialkylaluminum, the alkylaluminum hydride and the alkylaluminum halide can be activated by the promotion of this invention.

Karl Ziegler in his works on aluminum chemistry has indicated a great number of monoolefins which can be utilized in preparing the alkylaluminums in which the catalysts of this invention are useful. Representative of suitable olefins include both straight and branched chain aliphatic monoolefins, alicyclic olefins, the corresponding diolefin and arylolefins. For example, ethylene, propylene, butene-1, butene-2, isobutylene, pentene-1, pentene-2, hexene-1, 2-methylpentene-1, the mixed heptenes obtained by the copolymerization of propylene and butylene in the presence of a phosphoric acid catalyst, octene-1, octene-2, 2-ethylhexene-1, diisobutylene, propylene trimer, decene-1, propylene tetramer, triisobutylene and the like; cyclopentene, cyclohexene and their alkyl derivatives such as styrene, alpha-methylstyrene, indene and the like; butadiene, isoprene, piperylene, hexadiene and the like; as well as mixtures such as are obtained in refinery gas, or by cracking of paraffin waxes, foots oil, etc. can also be used or mixtures of any of the foregoing.

The terminal or alpha monoolefins form a preferred class since such alkyls of aluminum are intermediates for growth reaction, e.g. aluminumalkyl plus ethylene form aluminumalkyls of greater molecular weight than the original aluminumalkyl as follows:

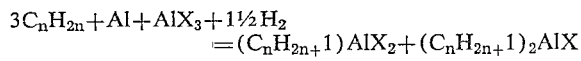

wherein the sum of carbon atoms in $R_4+R_5+R_6$ is equal to the sum of carbon atoms in $R_1+R_2+R_3+2n$. These alkyls can then be displaced with lower alkyls such as ethylene to produce the lower aluminumalkyls plus the higher olefin. On the other hand, these aluminumalkyls can be oxidized and subsequently hydrolyzed to produce alcohols and aluminum solt, e.g. aluminum sulfate when the hydrolysis is carried out in the presence of sulfuric acid. These olefins and alcohols have found considerable use in commerce. While in many applications, as in catalyst for example, the presence of mixed hydrocarbyl radicals in the hydrocarbyl aluminum is not significant, therefore, the internal olefins such as butene-2 can be used. When such an internal olefin is employed, a portion is isomerized to butene-1 and the resulting tributylaluminum contains a mixture of n-butyl and sec-butyl radicals. Therefore, when it is desired to prepare a relatively pure derivative, for example an alcohol through oxidation of the hydrocarbyl aluminum and hydrolysis of the oxidized product, the presence of mixed hydrocarbyl radicals in the starting hydrocarbyl aluminum will preclude obtaining a pure derivative. The preferred monoolefins are those containing 2 to 6 carbon atoms such as ehtylene, n-propylene, 1-butene, 1-pentene and 1-hexene.

The term "reaction-promoting" amount as used herein refers to that amount which catalyzes the reaction and, hence, is equivalent to catalytic amount. The exact amount to be used will depend upon the particular aluminum to be activated and the particular metal halide. In general, that amount will vary from about 0.01 weight percent to 2 percent based on the aluminum. While lower amounts may be helpful, it will generally be desirable to utilize at least 0.01 percent. A greater amount, of course, would be operable, but will not generally be required.

Generally, the reaction of the trialkylaluminum and hydrogen with the aluminum in presence of the metal halide is conducted at a temperature of 80 to 200° C., more preferably 100 to 150° C., and at a pressure of 60 to 350 atmospheres. An excess of hydrogen is used. The reaction will occur at any mole ratio of aluminum to trialkylaluminum, but generally a mole ratio from 0.1:1 to 10:1 is used. Preferably the mole ratio of aluminum to trialkylaluminum will be from 1:1 to 4:1.

The metal halide is preferably added to the aluminum just prior to the reaction with alkylaluminum and hydrogen or with olefin and hydrogen. However, the materials can be premixed at any point, e.g. the metal halide can be added to aluminum prior to the comminuting step such as by ball milling.

While it is not intended to be bound by any particular theoretical hypothesis as to how these metal halides activate the aluminum, it is presently believed they have a reducing effect on the aluminum, thus providing highly active, freshly reduced surfaces.

Such admixtures of aluminum and metal halide serve to reduce induction time and also serve to increase reaction rates. It is readily apparent that both serve to decrease overall reaction time, which is the primary practical objective.

The form of the aluminum used in preparing organoaluminum compounds does not fall within the scope of this invention. Generally, workers in the field have used comminuted aluminum, e.g. atomized particles or machine shavings, because a large surface area per unit of weight is afforded. In addition, it is customary to treat the aluminum to remove any coating of aluminum oxide. Ball milling of aluminum powder in kerosene-triethylaluminum solution is an example of the latter procedure. Regardless of the form or previous treatment of the aluminum, it has been found that the metal halides improve the reactivity of the aluminum.

To further illustrate the working of the invention, the following examples are given:

Example I

A run was made where 225 grams of "Alcoa" aluminum were ball milled for 24 hours in 250 ml. of a 14% solution of triethylaluminum in p-xylene. Two moles (54 grams) of the resulting aluminum were charged to a one-liter stirred alutoclave with 3 moles of triethylaluminum (342 grams). To this mixture, 2.7 grams of titanium tetrachloride were added. The reaction mixture was then heated to 250° F. and pressured with hydrogen to 2000 p.s.i.g. The temperature and pressure were maintained. Additional hydrogen was added during the course of the reaction to maintain the pressure. Samples were taken periodically of the product during the course of the reaction; hydrolyzed with hydrochloric acid and the resulting gaseous product analyzed. The data are shown below.

| Sample time, hrs. | Percent AlEt$_3$ converted |
|---|---|
| 0.10 | 49.2 |
| 0.25 | 69.7 |
| 1.00 | 75.8 |
| 2.00 | 76.7 |

Example II

A run was made utilizing the same conditions as Example I except no activator (TiCl$_4$) was utilized. The data are shown below.

| Sample time, hrs. | Percent AlEt$_3$ converted |
|---|---|
| 0.70 | 0.7 |
| 1.17 | 10.4 |
| 1.65 | 18.0 |
| 1.97 | 27.2 |
| 2.73 | 37.7 |

Example III

To a one-liter, agitated, stainless steel autoclave were charged 54 grams of ball milled aluminum powder, 342 grams of triethylaluminum and 0.84 gram of vanadium tetrachloride. The aluminum powder had been prepared by ball milling for 24 hours in kerosene containing 10% triethylaluminum.

The autoclave was heated to 270° F. and pressured to 1000 p.s.i.g. with hydrogen. Additional hydrogen was added during the run to maintain the pressure. The results of this run were as follows:

| Sample time, hrs. | Percent AlEt$_3$ converted |
|---|---|
| 0 | 2.6 |
| 0.55 | 42.4 |

Example IV

A second run as in Example III was made with the following results:

| Sample time, hrs. | Percent AlEt$_3$ converted |
|---|---|
| 0 | 2.8 |
| 0.05 | 15.5 |
| 0.10 | 30.9 |
| 0.15 | 43.6 |
| 0.20 | 49.1 |
| 0.25 | 56.5 |
| 0.35 | 61.8 |
| 0.45 | 64.9 |
| 0.55 | 68.5 |

Example V

Several runs were made according to Example III utilizing in place of vanadium tetrachloride, respectively, titanium trifluoride, titanium dichloride, hafnium tetrachloride, niobium pentafluoride, scandium tribromide, uranium tetrachloride and zirconium tetraiodide. In all cases the AlEt$_3$ is converted at a higher rate than is obtained in the absence of the activator.

Example VI

A run was made utilizing the conditions of Example III in the absence of any activator. No reaction took place.

Example VII

Several runs are made utilizing the method of Example I except in place of aluminum triethyl there is utilized respectively diethylaluminum chloride, diethylaluminum bromide, diisobutylaluminum iodide, dioctylaluminum fluoride, dipentadecylaluminum chloride, diphenylaluminum chloride, di-para-tertiarybutylphenyl aluminum, and triphenylaluminum. In each case the rate of conversion is superior to that obtained when no activator is used.

While particular embodiments of the invention have been described, it will be understood, of course, that the invention is not limited thereto, since many modifications can be made; and it is, therefore, contemplated to cover by the appended claims any such modifications as fall within the true spirit and scope of the invention.

The invention having thus been described, what is claimed is:

1. In a process for preparing dialkylaluminum hydride by the reaction of a trialkylaluminum, the alkyl radicals of said trialkylaluminum containing from 2 to 40 carbon atoms, with hydrogen and aluminum at an elevated temperature and superatmospheric pressure, the improvement comprising carrying out the reaction in the presence of a reaction-promotion amount of at least one catalytic halide of an element selected from the group consisting of titanium, zirconium, niobium, vanadium, scandium, uranium and hafnium.

2. The improvement of claim 1 wherein the reaction-promoting catalytic halide is present in an amount in the range 0.01 to 2 weight percent based on the amount of aluminum.

3. The improvement of claim 2 wherein the catalytic halide is a halide of titanium.

4. The improvement of claim 2 wherein the catalytic halide is a halide of zirconium.

5. The improvement of claim 2 wherein the catalytic halide is a halide of niobium.

6. The improvement of claim 2 wherein the catalytic halide is a halide of vanadium.

7. The improvement of claim 2 wherein the catalytic halide is a halide of scandium.

8. The improvement of claim 2 wherein the catalytic halide is a halide of uranium.

9. The improvement of claim 2 wherein the catalytic halide is a halide of hafnium.

10. The improvement of claim 2 wherein the halide is a chloride.

11. The improvement of claim 2 wherein the catalytic halide is titanium tetrachloride and the trialkylaluminum is triethylaluminum.

12. The improvement of claim 2 wherein the catalytic halide is vanadium tetrachloride and the trialkylaluminum is triethylaluminum.

References Cited

UNITED STATES PATENTS

| 3,104,252 | 9/1963 | Radd et al. | 260—448 |
| 3,322,806 | 5/1967 | Asinger et al. | 260—448 |

TOBIAS E. LEVOW, *Primary Examiner.*

HELEN M. S. SNEED, *Assistant Examiner.*